(12) United States Patent
Su

(10) Patent No.: US 11,406,089 B2
(45) Date of Patent: Aug. 9, 2022

(54) GLASS-TUBE HEATER

(71) Applicant: Wen-Hong Su, Taipei (TW)

(72) Inventor: Wen-Hong Su, Taipei (TW)

( * ) Notice: Subject to any disclaimer, the term of this patent is extended or adjusted under 35 U.S.C. 154(b) by 289 days.

(21) Appl. No.: 16/706,810

(22) Filed: Dec. 8, 2019

(65) Prior Publication Data

US 2021/0051925 A1 Feb. 25, 2021

(30) Foreign Application Priority Data

Aug. 20, 2019 (TW) ................................. 108211064

(51) Int. Cl.
*H05B 3/40* (2006.01)
*H05B 3/78* (2006.01)
*A01K 63/06* (2006.01)

(52) U.S. Cl.
CPC .............. *A01K 63/065* (2013.01); *H05B 3/40* (2013.01); *H05B 3/78* (2013.01)

(58) Field of Classification Search
None
See application file for complete search history.

(56) References Cited

U.S. PATENT DOCUMENTS

| | | | | |
|---|---|---|---|---|
| 2,477,363 A * | 7/1949 | Danner | ................... | H05B 3/80 219/473 |
| 2,811,629 A * | 10/1957 | Danner | ................. | A01K 63/065 219/523 |
| 3,107,289 A * | 10/1963 | Willinger | ............. | H05B 1/0213 219/489 |
| 3,564,589 A * | 2/1971 | Arak | ...................... | H01H 37/28 392/498 |
| 4,124,793 A * | 11/1978 | Colman | ............... | A01K 63/065 219/494 |
| 4,234,785 A * | 11/1980 | Lefebvre | .................. | H05B 3/78 219/494 |
| 4,327,281 A * | 4/1982 | Jager | ........................ | H05B 3/80 219/512 |
| 4,812,626 A * | 3/1989 | Strada | .................. | A01K 63/065 116/252 |
| 4,983,813 A * | 1/1991 | Van Tulleken | ...... | A01K 63/065 219/506 |
| 5,113,057 A * | 5/1992 | Tsai | ......................... | H05B 3/80 219/497 |
| 5,392,380 A * | 2/1995 | Tsai | ..................... | H05B 1/0213 219/523 |

(Continued)

*Primary Examiner* — Thor S Campbell
(74) *Attorney, Agent, or Firm* — Leong C. Lei

(57) ABSTRACT

A glass-tube heater includes a glass tube, a cap, and a temperature display unit. The glass tube is provided therein with an off-water protection sensor or a tipping switch, a control circuit board, one of a TRIAC and a relay, and a heating element. The control circuit board includes a control unit (which is an MCU or a comparator). All the components that are disposed in the glass tube are electrically connected to form a control circuit. Devices for temperature control, detection, and heating are all disposed inside the glass tube. The off-water protection sensor is operable to detect if being removed out of water for controlling the heating element to carry out heating or not, thereby ensuring quick termination of heating upon removal out of water. The tipping switch is operable to control the heating element from heating in case of excessive tipping of the heater.

10 Claims, 4 Drawing Sheets

(56) References Cited

U.S. PATENT DOCUMENTS

| | | | | | |
|---|---|---|---|---|---|
| 5,568,587 | A | * | 10/1996 | Marioni | A01K 63/065 |
| | | | | | 219/523 |
| 5,834,741 | A | * | 11/1998 | Tseng | H05B 3/80 |
| | | | | | 219/506 |
| 5,905,849 | A | * | 5/1999 | Ito | H05B 3/80 |
| | | | | | 392/498 |
| 6,061,500 | A | * | 5/2000 | Su | A01K 63/065 |
| | | | | | 119/262 |
| 6,097,007 | A | * | 8/2000 | Wang | H05B 3/80 |
| | | | | | 219/497 |
| 6,118,934 | A | * | 9/2000 | Tseng | A01K 63/065 |
| | | | | | 219/481 |
| 6,407,371 | B1 | * | 6/2002 | Toya | H05B 3/0047 |
| | | | | | 219/553 |
| 6,504,998 | B1 | * | 1/2003 | Yu-Chin | A01K 63/065 |
| | | | | | 219/490 |
| 6,584,280 | B1 | * | 6/2003 | Wang | A01K 63/065 |
| | | | | | 219/494 |
| 7,046,923 | B2 | * | 5/2006 | Magri | A01K 63/065 |
| | | | | | 219/501 |
| 7,049,554 | B2 | * | 5/2006 | Lolato | A01K 63/065 |
| | | | | | 219/489 |
| 7,680,400 | B2 | * | 3/2010 | Reusche | A01K 45/002 |
| | | | | | 392/497 |
| 8,041,199 | B2 | * | 10/2011 | Reusche | A01K 7/027 |
| | | | | | 392/497 |
| 2013/0087549 | A1 | * | 4/2013 | Wang | H05B 3/78 |
| | | | | | 219/489 |
| 2016/0345546 | A1 | * | 12/2016 | Wang | H05B 1/0222 |
| 2019/0059341 | A1 | * | 2/2019 | Su | A01K 63/065 |

* cited by examiner

GLASS-TUBE HEATER

TECHNICAL FIELD OF THE INVENTION

The present invention relates to an aquarium heater, and more particularly to a glass-tube heater that is shut down upon removal out of water or a heater that shuts down when excessively tipping.

DESCRIPTION OF THE PRIOR ART

In the modern, busy society, people often take various leisure or entertaining activities. An example is breeding aquatic plants and animals in an aquarium that is set up in an indoor space, or fishing breeding or aquatic plant growing is taken by occupation. Watching fishes swimming in water could help relax tense mood and stress.

To breed aquarium fishes, proper control of water temperature of the aquarium is an essential factor of well keeping the fishes. Heaters are commonly used to keep the temperature of an aquarium in order to prevent excessively low temperature of water inside the aquarium. This is of particular importance in wintertime. Although most of the fishes do not die of low temperature, improper water temperature would negatively affect the color and appetite of the fishes.

A conventional glass-tube heater does not offer a protection function of shutting down power supply upon removal out of water, and this often results in incidences of residual heat of the aquarium heater being excessively high or improper control of water temperature. For example, water level of an aquarium would drop due to water evaporation and in such an instance, ignorance of supplementing water would result in the glass tube of the heater that is set in heating getting cracked or broken by an excessively high temperature. This is a significant defect of the glass-tube heater and requires further improvement.

SUMMARY OF THE INVENTION

The primary objective of the present invention is to provide a glass-tube heater that shuts down power upon removal out of water so as to ensure quick termination of heating when removed out of water and thus prevent an excessively high temperature of heating.

To achieve the above objective, the present invention provides a glass-tube heater, which comprises a glass tube, a cap coupled to an end of the glass tube, and a temperature display unit. The glass tube is provided, in an interior thereof, with an off-water protection sensor, a control circuit board, one of a triode thyristor (TRIAC) and a relay, and a heating element. The control circuit board includes a control unit, and the control circuit board is electrically connected with the temperature display unit. The off-water protection sensor, the control unit, the one of the TRIAC and the relay, and the heating element are electrically connected together to form a control circuit. Upon detecting being located in water, the off-water protection sensor transmits a corresponding signal to the control unit, and the control unit controls, according to a detected water temperature, the one of the TRIAC and the relay to switch on for conducting electricity therethrough so as to control the heating element to carry out heating or not. Upon detecting being removed out of water, the off-water protection sensor transmits a corresponding signal to the control unit, and the control unit switches off the one of the TRIAC and the relay to cut off electricity so as to prevent the heating element from heating.

An efficacy of the present invention is that devices or components for temperature control, detection, and heating are all disposed inside the glass tube, and the off-water protection sensor is used to detect and identify if being removed out of water so as to control the heating element to heat or not thereby ensuring quick termination of heating upon removal out of water and preventing a heating temperature from being excessively high and eliminating situations of non-loaded heating after being removed out of water.

Another objective of the present invention is to provide a glass-tube heater, which upon excessively tipping, terminates heating so as to cut off power supply to prevent an excessively high heating temperature.

To achieve said another objective, the present invention provides a heater that comprises a glass tube, a cap coupled to an end of the glass tube, and a temperature display unit. The glass tube is provided, in an interior thereof, with a tipping switch, a control circuit board, one of a TRIAC and a relay, and a heating element. The control circuit board includes a control unit, and the control circuit board is electrically connected with the temperature display unit. The tipping switch, the control unit, the one of the TRIAC and the relay, and the heating element are electrically connected together to form a control circuit. The tipping switch is operable to transmit a signal to the control unit, and the control unit controls, according to a detected water temperature, the one of the TRIAC and the relay to switch on for conducting electricity therethrough so as to control the heating element to carry out heating or not. When the heater excessively tips, the tipping switch transmits a signal to the control unit, and the control unit controls the one of the TRIAC and the relay to cut off the electricity to prevent the heating element from heating.

An efficacy of the present invention is that devices or components for temperature control, detection, and heating are all disposed inside the glass tube, and the tipping switch controls the heating element to terminate heating so as to provide a function of shutting down power for safety protection.

DETAILED DESCRIPTION OF THE PREFERRED EMBODIMENT

Figure 1:
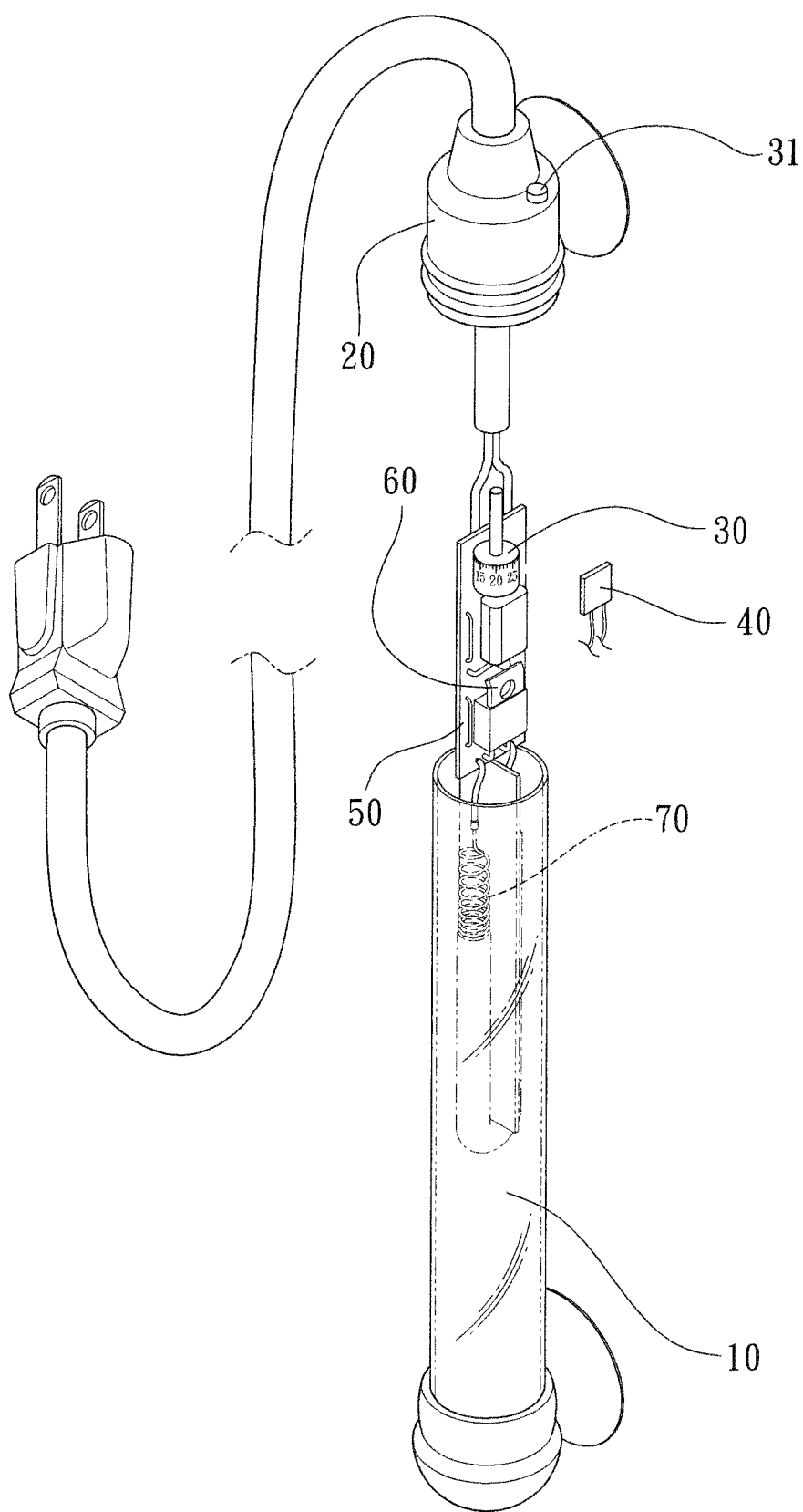
FIG. 1 is a perspective view, in an exploded view, showing the present invention.

Referring to FIG. 1, the present invention provides a heater, which comprises a glass tube 10, a cap 20 coupled to or otherwise mounted to an end of the glass tube 10, and a temperature display unit 30.

The glass tube 10 is provided, in an interior thereof, with an off-water protection sensor 40, a control circuit board 50, a switch element 60 (which can be one of a bidirectional triode thyristor (commonly abbreviated TRIAC) and a relay), and a heating element 70. The control circuit board 50 includes a control unit (not shown), and the control circuit board 50 is electrically connected with the temperature display unit 30. The drawing shows only a TRIAC 60 as an example for illustration, as a relay is functionally similar to the TRIAC 60 and provides the same effective operation.

The off-water protection sensor 40, the control unit, one of one of the TRIAC 60 and the relay, and the heating element 70 are electrically connected together to form a control circuit.

The off-water protection sensor 40, upon identifying being located in water, transmits a signal to the control unit, and the control unit makes control, according to a detected water temperature, on the one of the TRIAC 60 and the relay to switch on for conducting an electricity therethrough so as to control the heating element 70 to carry out heating or not.

The off-water protection sensor 40, upon identifying being removed out of water, transmits a signal to the control unit, and the control unit switch the one of the TRIAC 60 and the relay off to cut off electricity, so that the heating element 70 is prevented from further operation for heating.

As such, devices or components for temperature control, detection, and heating are all disposed inside the glass tube, and the off-water protection sensor is used to detect and identify if being removed out of water or kept in water so as to control the heating element to heat or not thereby ensuring quick termination of heating upon removal out of water and preventing a heating temperature from being excessively high and eliminating situations of non-loaded heating after being removed out of water.

Examples will be provided below for illustration.

In an embodiment, the control unit comprises one of a micro control unit (MCU) and a comparator.

In an embodiment, the heating element 70 is selected as one of a heating filament and a heating device.

In an embodiment, the temperature display unit 30 is made in a scale or graduation form and is controlled through a rotary knob 31 for temperature setting.

Figure 2:
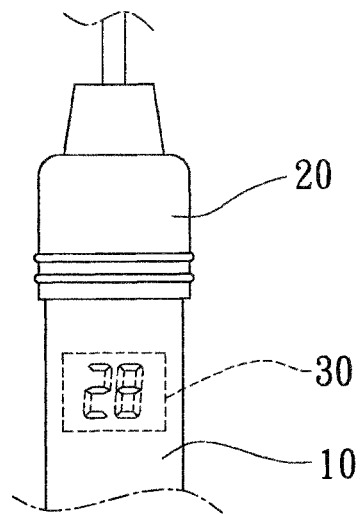
FIG. 2 is a schematic view showing a different example of a temperature display unit according to the present invention.
Figure 3:
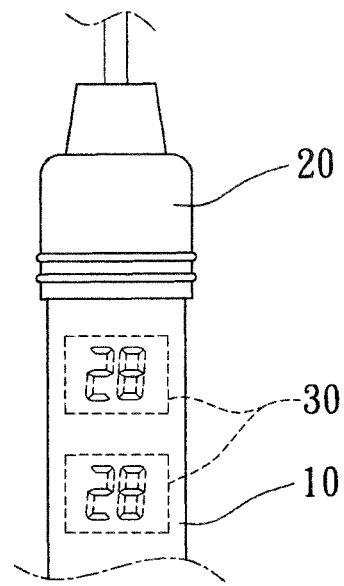
FIG. 3 is a schematic view showing a further example of the temperature display unit according to the present invention.

Referring to FIGS. 2 and 3, in an embodiment, the temperature display unit 30 is setup as a single-screen display or a dual-screen display.

Figure 4:
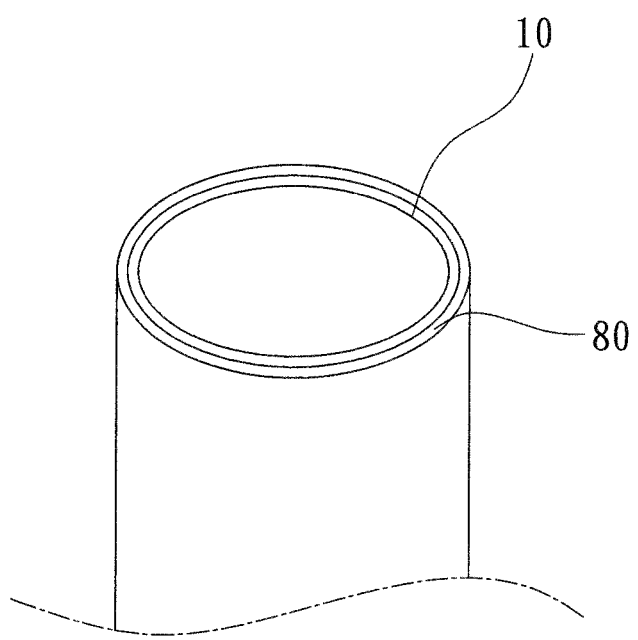
FIG. 4 is a schematic view showing a different example of a glass tube according to the present invention.

Referring to FIG. 4, in an embodiment, the glass tube 10 is fitted with and encompassed by a plastic tube 80 to provide an enhanced effect of water resistance.

Figure 5:
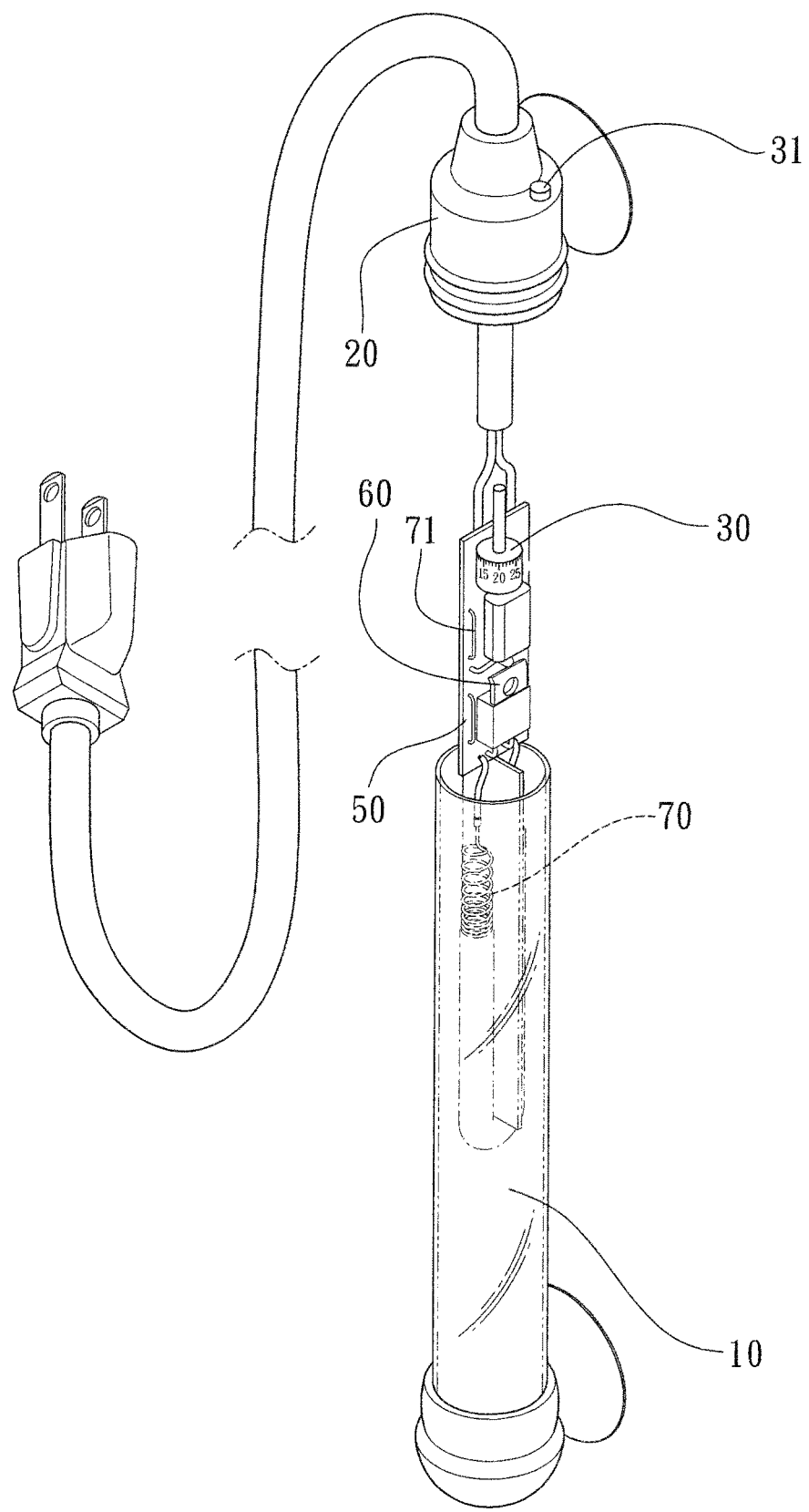
FIG. 5 is a schematic view showing a different embodiment of the present invention.

Referring to FIG. 5, another embodiment of the heater according to the present invention is shown, which comprises a glass tube 10, a cap 20 coupled to or otherwise mounted to an end of the glass tube 10, and a temperature display unit 30.

The glass tube 10 is provided, in an interior thereof, with a tipping switch 71, a control circuit board 50, a switch element 60 (which can be one of a TRIAC and a relay), and a heating element 70. The control circuit board 50 includes a control unit (not shown), and the control circuit board 50 is electrically connected with the temperature display unit 30. The drawing shows only a TRIAC 60 as an example for illustration, as a relay is functionally similar to the TRIAC 60 and provides the same effective operation.

The tipping switch 71, the control unit, one of the TRIAC 60 and the relay, and the heating element 70 are electrically connected together to form a control circuit.

In this arrangement, the tipping switch 71 is operable to transmit a signal to the control unit, and the control unit makes control, according to a detected water temperature, on the one of the TRIAC 60 and the relay to switch on for conducting an electricity therethrough so as to control the heating element 70 to carry out heating or not.

When the heater is excessively tipping, the tipping switch 71 transmits a signal to the control unit, and the control unit switches off the one of the TRIAC and the relay for cutting off electricity, so that the heating element 70 is prevented from further operation for heating.

As such, devices or components for temperature control, detection, and heating are all disposed inside the glass tube, and the tipping switch controls the heating element to terminate heating so as to provide a function of shutting down power for safety protection.

In summary, the present invention could surely achieve the desired purposes and demonstrates a value of practical use.

I claim:

1. A glass-tube heater, comprising a glass tube, a cap coupled to an end of the glass tube, and a temperature display unit, wherein the glass tube is provided, in an interior thereof, with an off-water protection sensor, a control circuit board, a switch element, and a heating element, the control circuit board comprising a control unit, the control circuit board being electrically connected with the temperature display unit; and the off-water protection sensor, the control unit, the switch element, and the heating element are electrically connected together to form a control circuit;

wherein the off-water protection sensor, upon identifying being located in water, transmits a signal to the control unit, and the control unit is operable, according to a detected water temperature, to control the switch element to switch one for conducting electricity, so as to control operation of the heating element for heating or not; and the off-water protection sensor, upon identifying being removed out of water, transmits a signal to the control unit, and the switch element cuts off the electricity to prevent the heating element from heating, wherein the off-water protection sensor is responsive to a state where the glass-tube heater is out of water to signal the control unit to cut off the electricity supplied to the heating element by means of the switch element that is separate from the off-water protection sensor, and wherein the temperature display unit comprises a dual-screen display.

2. A glass-tube heater, comprising a glass tube, a cap coupled to an end of the glass tube, and a temperature display unit, wherein the glass tube is provided, in an interior thereof, with a tipping switch, a control circuit board, a switch element, and heating element, the control circuit board comprising a control unit, the control circuit board being electrically connected with the temperature display unit; and the tipping switch, the control unit, the switch element, and the heating element are electrically connected together to form a control circuit;

wherein the tipping switch is operable to transmit a signal to the control unit, and the control unit and the control unit is operable, according to a detected water temperature, to control the switch element to switch one for conducting electricity, so as to control operation of the heating element for heating or not; and when the heater excessively tips, the tipping switch transmits a signal to the control unit, and the control unit controls the switch element to cut off the electricity to prevent the heating element from heating, wherein the tipping switch, the control unit, the switch element, and the heating element are housed in and enclosed by the glass tube, and the tipping switch is responsive to a state where the glass-tube heater tips to signal the control unit to cut off the electricity supplied to the heating element by means of the switch element that is separate from the tipping switch, and wherein the temperature display unit comprises a dual-screen display.

3. The glass-tube heater according to claim 1, wherein the control unit comprises one of a micro control unit (MCU) and a comparator.

4. The glass-tube heater according to claim 1, wherein the heating element comprises one of a heating filament and a heating device.

5. The glass-tube heater according to claim 1, wherein the temperature display unit comprises a scale or graduation based device that is operable by a rotary knob for temperature setting.

6. The glass-tube heater according to claim 1, wherein the switch element comprises one of a TRIAC and a relay.

7. The glass-tube heater according to claim 2, wherein the control unit comprises one of a micro control unit (MCU) and a comparator.

8. The glass-tube heater according to claim 2, wherein the heating element comprises one of a heating filament and a heating device.

9. The glass-tube heater according to claim 2, wherein the temperature display unit comprises a scale or graduation based device that is operable by a rotary knob for temperature setting.

10. The glass-tube heater according to claim 2, wherein the switch element comprises one of a TRIAC and a relay.

* * * * *